United States Patent
Castellucci et al.

(10) Patent No.: US 11,295,497 B2
(45) Date of Patent: Apr. 5, 2022

(54) DYNAMIC SUBTITLE ENHANCEMENT

(71) Applicant: International Business Machines Corporation, Armonk, NY (US)

(72) Inventors: Antonio Castellucci, Rome (IT); Daniele Morgantini, Rome (IT); Carola Girolami, Rome (IT); Giorgio Anselmi, Formello (IT)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/694,207

(22) Filed: Nov. 25, 2019

(65) Prior Publication Data

US 2021/0158586 A1 May 27, 2021

(51) Int. Cl.
*G06T 11/60* (2006.01)
*H04N 5/278* (2006.01)
*G06T 7/33* (2017.01)
*G06T 7/90* (2017.01)

(52) U.S. Cl.
CPC ........... *G06T 11/60* (2013.01); *G06T 7/33* (2017.01); *G06T 7/90* (2017.01); *H04N 5/278* (2013.01)

(58) Field of Classification Search
CPC .. G06T 11/60; G06T 7/33; G06T 7/90; H04N 5/278
See application file for complete search history.

(56) References Cited

U.S. PATENT DOCUMENTS

| | | | |
|---|---|---|---|
| 7,191,117 B2 | 3/2007 | Kirby | |
| 8,074,168 B2 | 12/2011 | Zingher | |
| 9,013,551 B2 | 4/2015 | Zhang | |
| 10,290,110 B2 | 5/2019 | Lawrence | |
| 2008/0291206 A1* | 11/2008 | Uchimura | H04N 5/85 345/467 |
| 2016/0286140 A1 | 9/2016 | Ying | |
| 2016/0352971 A1* | 12/2016 | Kanematsu | H04N 1/60 |
| 2017/0365072 A1* | 12/2017 | Vadhri Venkata | G06F 8/38 |

(Continued)

FOREIGN PATENT DOCUMENTS

EP 2076031 B1 11/2010

OTHER PUBLICATIONS

"Color Difference", Wikipedia, 6 pps., last edited on Jul. 27, 2019, <https://en.wikipedia.org/wiki/Color_difference>.

(Continued)

*Primary Examiner* — Sunghyoun Park
(74) *Attorney, Agent, or Firm* — David K. Mattheis; Maeve M. Carpenter (57) ABSTRACT

A method for modifying a subtitle of a video frame. Subtitle text representing audio content of a video frame and font attributes of the subtitle text are received. A color of the subtitle text is identified, based on the font attributes of the subtitle text. A geometric region within the video frame corresponding to a display area of the subtitle text. A predominant color of the geometric region within the video frame is calculated. A level of similarity between the color of the subtitle text and the predominant color of the geometric region is determined. Rendering information of the subtitle text is calculated, based on the level of similarity, and a modification of the subtitle text is performed by applying the rendering information to the subtitle text, such that the modification reduces the similarity level during display of the video frame.

20 Claims, 6 Drawing Sheets

(56) References Cited

U.S. PATENT DOCUMENTS

2018/0012369 A1* 1/2018 Lawrence ................. G06T 7/33
2020/0013206 A1* 1/2020 Seely .................... G06F 40/169

OTHER PUBLICATIONS

"Tutorial: Find Dominant Colors in an Image through Clustering", Dataquest, printed from the Internet on Aug. 2019, 1 pp., <https://www.dataquest.io/blog/tutorial-colors-image-clustering-python/>.

Akahori et al., "Dynamic Subtitle Placement Considering the Region of Interest and Speaker Location", In Proceedings of the 12th International Joint Conference on Computer Vision, Imaging and Computer Graphics Theory and Applications (VISIGRAPP 2017), pp. 102-109, <https://pdfs.semanticscholar.org/2864/cfd949e5b787b1fd22c05b5bb6450197a72e.pdf>.

Davoudi et al., "A Fuzzy Logic-Based Video Subtitle and Caption Coloring System", Hindawi Publishing Corporation Advances in Fuzzy Systems vol. 2012, Article ID 671851, 9 pages, Research Article, Received Oct. 15, 2011; Accepted Jan. 31, 2012, <https://www.hindawi.com/journals/afs/2012/671851/>.

Sinha, "Finding dominant colors in an image", AI Shack, 8 pps., printed from the Internet on Aug. 1, 2019, <http://www.aishack.in/tutorials/dominant-color/>.

* cited by examiner

SUBTITLE ENHANCED BY TONE VARIATION OF TEXT

SUBTITLE ENHANCED BY ADDING OUTLINE STROKE TO TEXT

DYNAMIC SUBTITLE ENHANCEMENT

FIELD OF THE INVENTION

The present invention relates generally to the field of accessibility features, and more particularly to improved text subtitles of video content.

BACKGROUND OF THE INVENTION

Text subtitles are often used to present a visual text display of audio content. Subtitles may be applied to video, live streaming, television, or presented on configured visual displays for audio delivered content, such as a podcast.

Text subtitles are a widely adopted solution supporting the hearing impaired and are often used to augment the audio component of a video due to volume variations, facilitate learning foreign languages, or provide local language to content generated in non-local languages. Subtitle text is often consistently positioned in the video frame to facilitate location and visualization by the viewing user.

SUMMARY

Embodiments of the present invention disclose a method, computer program product, and system. The embodiments provide a method for modifying a subtitle of a video frame, the method provides for one or more processors to modify a subtitle of a video frame in which the subtitle includes a textual representation of audio content corresponding to the video frame. One or more processors receive subtitle text representing audio content of a video frame and font attributes associated with the subtitle text. The one or more processors identify a color associated with the subtitle text, based on the font attributes associated with the subtitle text. The one or more processors calculate a geometric region within the video frame corresponding to a display area of the subtitle text. The one or more processors calculate a predominant color of the geometric region within the video frame. The one or more processors determine a level of similarity between the color associated with the subtitle text and the predominant color of the geometric region within the video frame. The one or more processors calculate rendering information of the subtitle text, based on the level of similarity, and the one or more processors performing a modification of the subtitle text by applying the rendering information to the subtitle text, such that the modification reduces the similarity level during display of the video frame.

DETAILED DESCRIPTION

Embodiments of the present invention recognize that including subtitles in videos, movies, and similar assets, enriches the content for audiences requiring accessibility features; however, the inclusion of subtitles adds additional problem areas to be considered. Text subtitles are a commonly adopted solution for the hearing impaired and facilitate translation and learning new languages. Rendering subtitles that are clearly visible against a dynamically changing background presents a constant challenge. Use of a consistent color block for subtitles can obfuscate content of a video, negatively affecting user experience. Often a character speaking in a video is identified by a color of the subtitle text associated with the character, referred to as speaker-based-color (SBC). Merely rendering the subtitle text in a particular color invites the opportunity for a lack of contrast between the background and subtitle colors, resulting in subtitles that are unreadable, again affecting the user experience.

Embodiments of the present invention provide a method, computer program product, and computer system for enhancing the subtitle text video frames in which the subtitle includes a textual representation of audio content corresponding to the video frame. In some embodiments the video frame is modified to enhance the contrast of the subtitle text to the background colors of the video frame as part of a live feed of video content received along with subtitle text. In other embodiments the resulting modification of video frame subtitles are stored and are used as a feed of video with enhanced subtitles. Embodiments of the present invention determine font properties of subtitle text, determine the geometric region occupied by the subtitle text within the video frame (sometimes referred to as screen occupancy or occupancy area), and calculate the predominant color associated with the screen occupancy.

Embodiments of the present invention calculate a level of similarity between the color of the subtitle text and the predominant color of the portion of the screen occupancy in which the subtitle text is displayed. Embodiment determine whether the level of similarity indicates a low, mid, high, or very high level of similarity between the colors and performs appropriate modification of the subtitle text based on the level of similarity. The resulting modified subtitle text (also described herein as "enhanced" or receiving "enhancement"), is rendered with the video frame to produce a video with enhanced subtitle text, improving the user experience.

In some embodiments of the present invention, the relative video frame portion associated with a full sentence of the subtitle text, the words composing the sentence, and the characters composing the words of the subtitle text, are determined. The predominant color for the corresponding portions of the background of the video frame are determined and a level of similarity is calculated for each portion at the sentence, word, and character level, which can be calculated in parallel. Determining a level of similarity at different portion granularity of the video frame enables modification of subtitle text at the character, word, or sentence level and avoids instances in which sections of the subtitle are lost in similar background colors. In some embodiments, if the subtitle text is missing or lacking, then a speech-to-text module is applied during pre-processing of the video and the resulting text output is used to generate a subtitle file.

Figure 1:
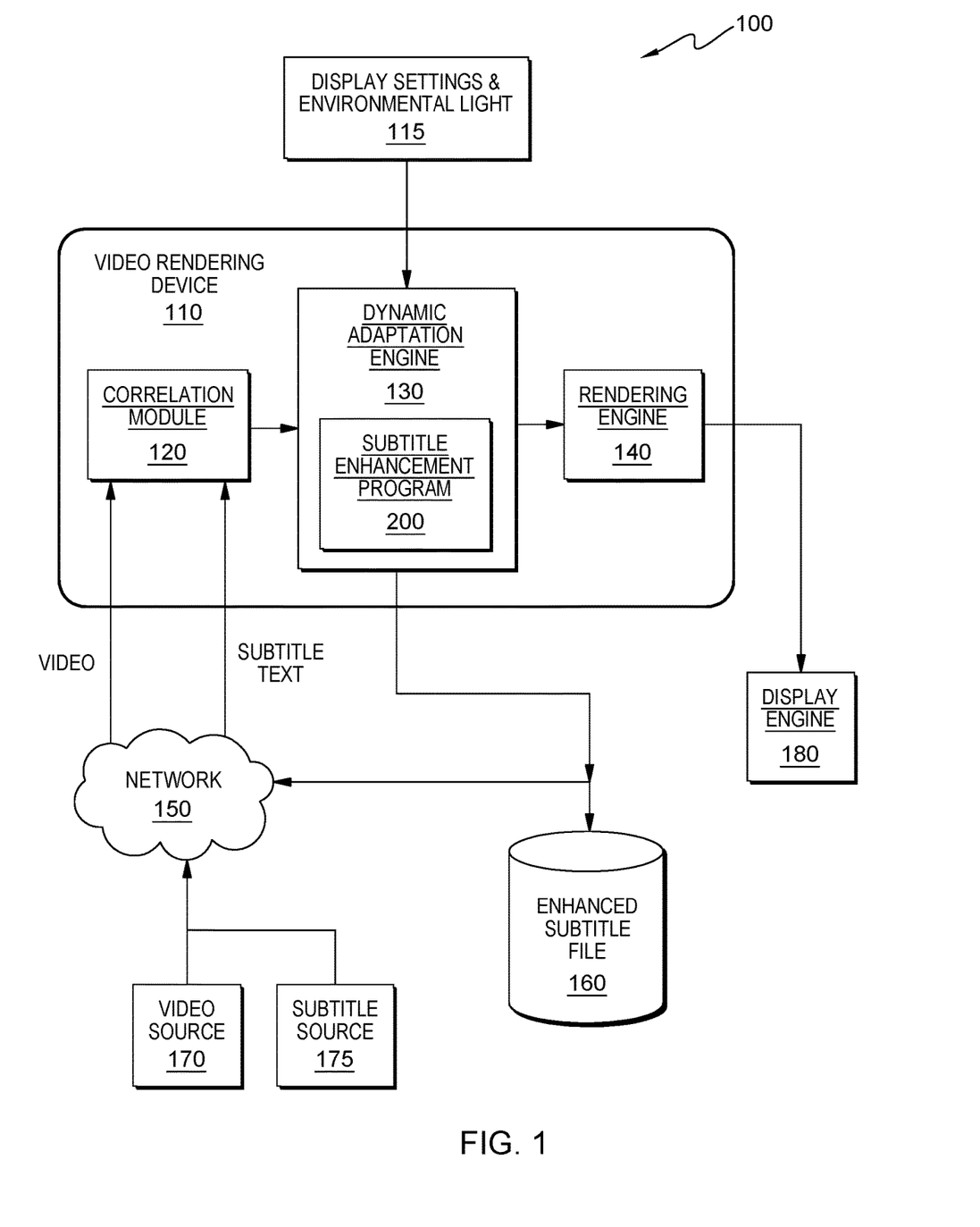
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes video rendering device 110, enhanced subtitle file 160, video source 170, subtitle source 175 and display device 180, all connected via network 150. Video rendering device 110 further includes correlation module 120, dynamic adaptation engine 130, and rendering engine 140, and dynamic adaptation engine 130 includes subtitle enhancement program 200.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between video rendering device 110, correlation module 120, dynamic adaptation engine 130, enhanced subtitle file 160, video source 170 and subtitle source 175, in accordance with embodiments of the present invention.

Video rendering device 110 receives video content and subtitle text content from video source 170 and subtitle source 175, respectively. Video rendering device 110 correlates the subtitle text to corresponding video frames, as performed by correlation module 120, performs modifications to the subtitle text by dynamic adaptation engine 130, based on a determined similarity level between subtitle text color and background color of the screen occupancy area of the video frames, and renders the enhanced subtitle text within the corresponding video frame, as performed by rendering engine 140. Video rendering device 110 sends the rendered video content to display device 180 from which the video and enhanced subtitle text is displayed and viewed.

In some embodiments of the present invention, video rendering device 110 is an add-on to existing video player devices that receive video and subtitle content from streaming sources, or from recorded sources. In other embodiments, video rendering device 110 is an integrated component of video player devices and includes dynamic adaptation engine 130 and subtitle enhancement program 200 to perform modifications to subtitles of audio/video content based on a determined level of similarity of color between subset sections of the subtitle text and the color of corresponding background portions of the video frame. In other embodiments, video rendering device is a stand-alone device that correlates video content and subtitle text feeds, performs modification to subtitle text and stores the resulting feed in enhanced subtitle file 160. The stored subtitle text is available to provide enhanced subtitle text video to devices without enhancement capabilities described herein.

Video rendering device 110 includes computing capabilities to operate subtitle enhancement program 200 and enable receipt of video and subtitle text feeds, and transmission of enhanced subtitle text video to storage in enhanced subtitle file 160 or display device 180. Video rendering device 110 can be a standalone computing device, a smart phone, a tablet computer, a laptop computer, or any other electronic device or computing system capable of receiving, sending, and processing data. In other embodiments, video rendering device 110 can represent a computing device interacting with applications and services hosted and operating in a cloud computing environment. In another embodiment, video rendering device 110 can be a netbook computer, a desktop computer, a personal digital assistant (PDA), or other programmable electronic device capable of communicating with video source 170, subtitle source 175, enhanced subtitle file 160, display device 180 and display settings, environmental light 115, and other computing devices (not shown) within distributed data processing environment 100 via network 150. In another embodiment, video rendering device 110 represents a computing system utilizing clustered computers and components (e.g., database server computers, application server computers, etc.) that act as a single pool of seamless resources when accessed within distributed data processing environment 100. Video rendering device 110 may include internal and external hardware components, depicted in FIG. 6.

Correlation module 120 includes hardware and software components to receive input of video content and subtitle text and align the subtitle text with the appropriately corresponding frames of the video content. In some embodiments, correlation module 120 receives streaming video and subtitle text, in which the frames of the video content include a frame time indicator and the subtitle text includes a corresponding frame time enabling correlation. In some embodiments, correlation module 120 is a component in a standard video player device and receives video content input, and input of enhanced subtitle text from enhanced subtitle file 160, enabling the standard video player device to render enhanced subtitle text in the displayed output.

Dynamic adaptation engine 130 is a component of video rendering device 110 and performs enhancement to subtitle text of frames of the video content. Dynamic adaptation engine 130 receives a feed of video frames and corresponding subtitle text from correlation module 120. Dynamic adaptation engine 130 includes subtitle enhancement program 200 that performs the steps of determining the level of similarity between the color of subtitle text and the color of the corresponding portion of background of the video frame and determines the enhancement response based on the level of similarity. In some embodiments, dynamic adaptation engine 130 and the operational steps of subtitle enhancement program 200, output a feed of video frames with corresponding enhanced subtitle text. In other embodiments, dynamic adaptation engine 130 and the operational steps of subtitle enhancement program 200, output enhanced subtitles to a file, such as enhanced subtitle file 160, including frame timing information to enable a standard video player to receive input from enhanced subtitle file 160 and display the video content with the enhanced subtitle text, without requiring the presence of dynamic adaptation engine 130.

Subtitle enhancement program 200 receives the video and correlated subtitle text and determines the level of similarity between the color of a portion of the subtitle text and the color of the corresponding portion of background of the frame. Subtitle enhancement program 200 verifies that subtitle input is available and selects subtitle text from a video frame. Subtitle enhancement program 200 determines the color of a sentence of the subtitle text and determines the predominant color of individual portions of the background of the video frame, which are subsets of the entire background of the subtitle text sentence. Subtitle enhancement program 200 determines a level of similarity between the subtitle text color and the color of corresponding portions of the background on which the subtitle text is displayed, and based on the level of similarity, performs an enhancement action.

Rendering engine 140 is a component of video rendering device 110 that receives the enhanced subtitle text and corresponding video frame, renders the enhanced subtitle text onto the video frame and sends the video frame to display device 180.

Enhanced subtitle file 160 provides for storage of enhanced subtitle text. In some embodiments of the present invention, enhanced subtitle file 160 provides a source of subtitle text, such as provided by subtitle source 175, but includes enhancements to the subtitle text previously performed by dynamic adaptation engine 130 and subtitle enhancement program 200. The previously enhanced subtitle text stored in enhanced subtitle file 160 is received by a standard video player device, without dynamic adaptation engine 130 and subtitle enhancement program 200 and renders video frames with the enhanced subtitle text.

Video source 170 and subtitle source 175 are respective sources of video content that includes audio content as well, and subtitle text corresponding to the audio portions of the video content. In some embodiments, video source 170 and subtitle source 175 are streaming sources of video and subtitle text content, respectively. In other embodiments, video source 170 and subtitle source 175 are recorded content received by video rendering device 110.

Display device 180 displays the output from rendering engine 140 of video rendering device 110 and includes display of a sequence of video frames and the enhanced subtitle text corresponding to each video frame displayed. In some embodiments, display device 180 may be, but is not limited to, a television or a display monitor, whereas in other embodiments, display device 180 may be, but is not limited to a tablet, a smart phone, a laptop, a smart watch, or a visual display of a virtual assistant.

Figure 2:
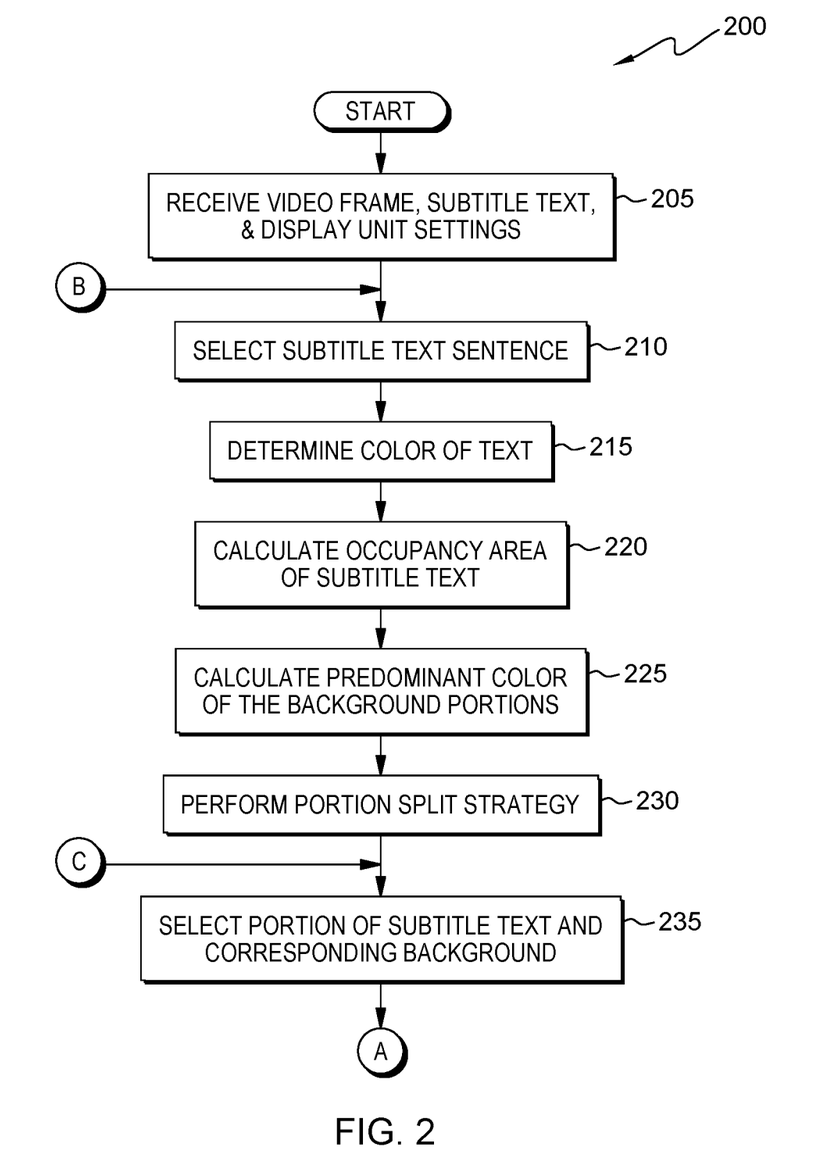
FIG. 2 is a flowchart illustrating the operational steps of a subtitle enhancement program, in accordance with an embodiment of the present invention.

FIG. 2 is a flowchart illustrating the operational steps of subtitle enhancement program 200, operating within the distributed data processing environment of FIG. 1, in accordance with an embodiment of the present invention. Subtitle enhancement program 200 receives a video frame and subtitle text from video and subtitle source feeds and receives display unit settings (step 205). The received video frame and subtitle text are correlated to align the subtitle text to the frame time of the received video frame by pre-processing, which aligns the subtitle text to the audio equivalent associated with a series of video frames. In some embodiments, dynamic adaptation engine 130, operating subtitle enhancement program 200, receives the video frame and subtitle text as streaming inputs. In other embodiments, dynamic adaptation engine 130, operating subtitle enhancement program 200 receives the video frame and subtitle text from recorded content.

In some embodiments, subtitle enhancement program 200 receives information regarding the settings of the display unit receiving the resulting enhancement of subtitle text, which further includes environmental lighting conditions, if available, associated with the location of the display unit. The display unit settings and environmental lighting conditions are included in determining the threshold of levels of similarity between the subtitle text color and the color of portions of the background of the video frame corresponding to the screen occupancy of the subtitle text.

Subtitle enhancement program 200 selects a subtitle text sentence (step 210). Subtitle text provides a visual representation of audio content corresponding to a series of video frames. The video frame is received with correlated subtitle text content which may include one or more phrases or sentences that are spoken by a character of the video. In some embodiments, subtitle enhancement program 200 selects a set of words that may be that of a sentence or a tokenized phrase that is part of the entire subtitle text associated with the video frame. Sentences as used herein may include true sentences, or tokenized collections of words included in the subtitle text associated with the video frame.

Subtitle enhancement program 200 determines a color of the subtitle text (step 215). Along with receiving the subtitle text correlated to the frame time of the video frame, subtitle enhancement program 200 also receives font attributes associated with the subtitle text. In some embodiments, the font attributes include the font type, size, and may include the length of the characters associated with the selected sentence of subtitle text. The font attributes also include the font color of the subtitle text. In some embodiments, a particular color is applied to subtitle text based on the character speaking the text in the video frame and the font color changes for different speakers. Font color of text assigned to a speaking character is referred to as speaker-based color (SBC) and serves to help identify who in the video content is speaking the subtitle text. In some embodiments, a default font color is identified and applied for all speakers. For example, a selected sentence of subtitle text may have font attributes of font type: Calibri, font size: 8, and color: white.

Subtitle enhancement program 200 calculates the occupancy area of the subtitle text for the video frame (step 220). The subtitle text sentence is aligned with a position within the video frame, typically along the bottom edge of the frame. Subtitle enhancement program 200 determines the area occupied by the subtitle text sentence based on the font type, font size, and number of characters in the subtitle text sentence, sometimes referred to as the screen occupancy. Subtitle enhancement program 200 determines the geographic region in which the subtitle text sentence is displayed on the video frame by determining pixel counts of characters and spaces separating and bordering characters of the subtitle text sentence.

For example, subtitle enhancement program 200 determines the pixel count for the length and width of the characters included in the subtitle text sentence selected. Subtitle enhancement program 200 further determines the pixel count of spaces between characters and bordering above and below characters of the subtitle text sentence and calculates an area that the subtitle text occupies as well as locating the position of the area as displayed on the video frame.

Subtitle enhancement program 200 calculates the predominant color of the background portions corresponding to the occupancy area (step 225). Having identified the area occupied by the subtitle text sentence, subtitle enhancement program 200 determines portions of the occupancy area. In some embodiments of the present invention, subtitle enhancement program 200 determines the area corresponding to the entire sentence as a portion, the area corresponding to each word of the sentence as a separate portion, and the area surrounding each character of each word as a separate portion. Subtitle enhancement program 200 determines the portions by pixel areas, and subtitle enhancement program 200 applies the RBG color combination for each pixel within a portion to techniques used to determine the predominate color within portions of an image, such as eigenvector or clustering techniques. In some embodiments, subtitle enhancement program 200 can calculate the predominant color of the portions in parallel. Subtitle enhancement program 200 can determine the predominant color of the background portions for the overall sentence of the subtitle text, each of the words of the sentence, and each of the characters of the words.

Subtitle enhancement program 200 performs a portion split strategy (step 230). Subtitle enhancement program 200 considers the predominant color of the background portions to determine instances in which two or more segments of the same word or sentence of the subtitle text are displayed on different background colors. The demarcation of a change of the predominant background color within the sentence or word of the subtitle text is used to define potential enhancement portions. Subtitle enhancement program 200 identifies the occurrence of potential enhancement portions, which defines the portion split strategy applied to the subtitle text sentence. In an alternate embodiment, subtitle enhancement program 200 identifies the occurrence of a subset of the potential enhancement portions, which defines the portion split strategy applied to the subtitle text sentence.

For example, subtitle enhancement program 200 determines the predominant background color for the entire sentence of subtitle text, and each word of the subtitle text, as well as the predominant background color surrounding each character of the subtitle text. Based on the predominant background color of each of the different portions of the subtitle text, subtitle enhancement program 200 determines the positions of the subtitle text in which a portion of the sentence or words within the sentence has a change in the background color. Subtitle enhancement program 200 determines the areas between the change in background color, in which the predominant color is consistent, to be a potential enhancement portion and includes the portion area as part of the portion split strategy. The portions are considered "potential" for enhancement at this point because the level of similarity and the enhancement action is not yet determined.

Subtitle enhancement program 200 selects a portion of the subtitle text and corresponding background (step 235). To determine the degree of difference between subtitle text color and background color for a given potential enhancement portion, subtitle enhancement program 200 selects one of the potential enhancement portions that includes the portion of subtitle text of the sentence and the corresponding background area of the portion of subtitle text. Having selected a portion of the subtitle text and the corresponding background area of the subtitle text portion, subtitle enhancement program 200 proceeds to "A", and continues with operational steps depicted in FIG. 3.

Figure 3:
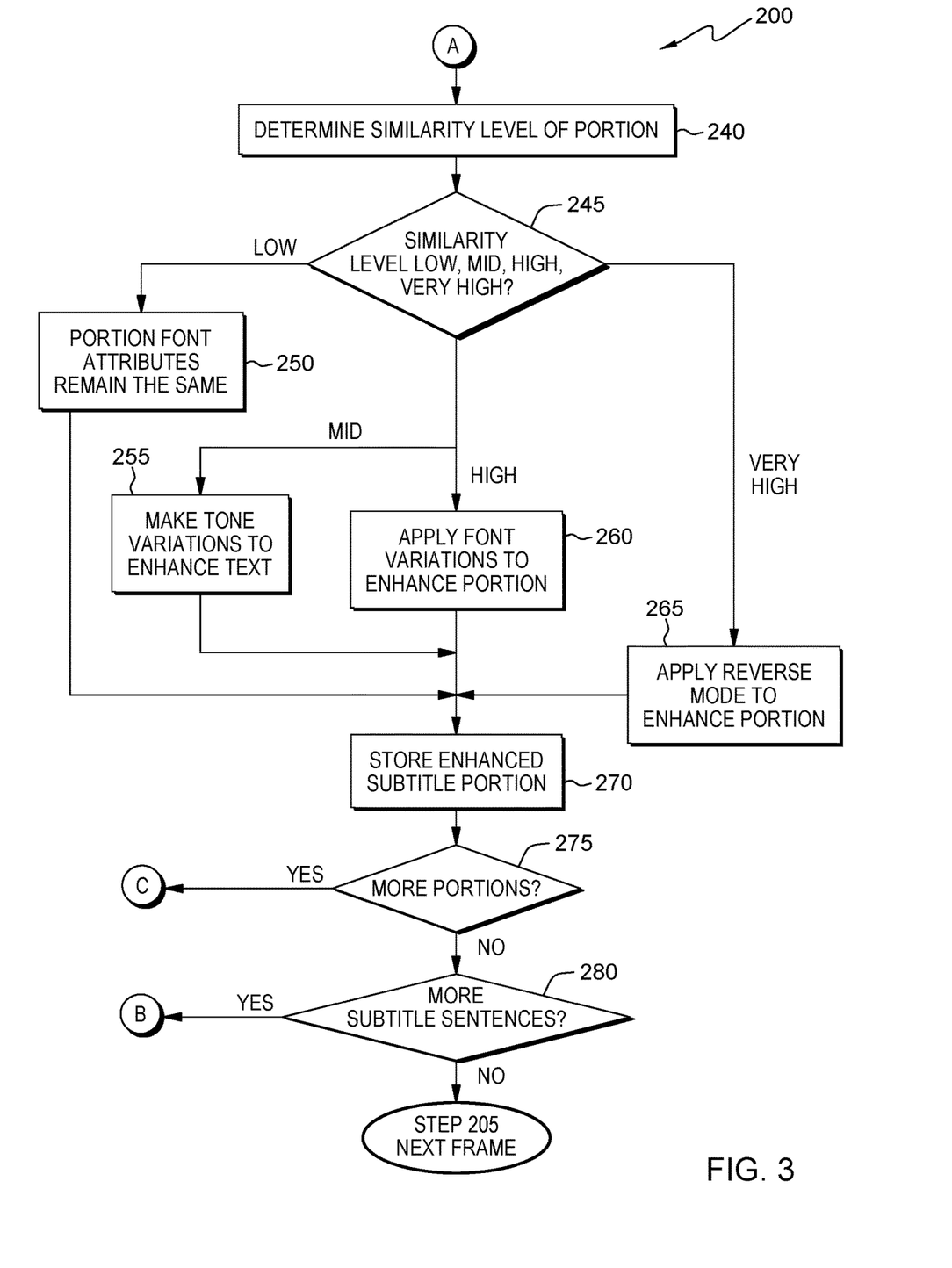
FIG. 3 is a continuation of the flowchart of FIG. 2, illustrating the operational steps of the subtitle enhancement program operating within the distributed data processing environment of FIG. 1, in accordance with an embodiment of the present invention.

FIG. 3 is a continuation of the flowchart of FIG. 2, illustrating the operational steps of subtitle enhancement program 200 operating within the distributed data processing environment of FIG. 1, in accordance with an embodiment of the present invention. Subtitle enhancement program 200 proceeds from "A" and determines a level of similarity of the selected portion (step 240). Subtitle enhancement program 200 determines the level of similarity between the color of the subtitle text and the color of the background corresponding to the selected portion.

In some embodiments of the present invention, subtitle enhancement program 200 utilizes the Euclidian distance to calculate the distance between the color of the subtitle text and the color of the background portion corresponding to the segment of the subtitle text. Distance between colors is a metric included in color science which allows a quantified examination of color properties. In some embodiments of the present invention, the RGB (Red, Green, Blue) tuple components of a color are applied as linear dimensions defining a position within a color space. The distance between colors within the color space can then be geometrically calculated. In some embodiments, threshold distances are pre-determined by comparison of displayed text and background colors and may include consideration of display device settings and environmental lighting in the viewing area to ensure adequate contrast for optimal user experience.

For example, subtitle enhancement program 200 determines the subtitle text color from font attribute properties previously received with the subtitle text of the video frame. The RGB tuple of the subtitle text is determined as well as the RGB tuple of the color of the corresponding background portion. Subtitle enhancement program 200 can apply the tuples to a color space and calculate the distances between the colors. Previously determined thresholds indicate whether the resulting level of similarity between colors is one of pre-determined categories of "low", "mid", "high", and "very high" similarity. In some embodiments, subtitle enhancement program 200 applies other categories to the determined distance between colors to reflect the level of similarity. In some embodiments, subtitle enhancement program 200 determines the level of similarity based on comparison of the distance between the subtitle text color and the color of the background portion to the pre-determined thresholds for "low, mid, high, and very high" similarity. In some embodiments, the establishment of thresholds for corresponding levels of similarity enable an enhancement strategy in which one or more enhancement actions are associated with a level of similarity.

Subtitle enhancement program 200 determines whether the level of similarity is low, mid, high, or very high (decision step 245). Subtitle enhancement program 200 compares the distance determined between the subtitle text color and the color of the background portion, to the thresholds defining pre-determined levels of similarity. In some embodiments, the pre-determined levels of similarity include "low", "mid", "high", and "very high" similarity, and correspond respectively to pre-determined Euclidian distances (or distance ranges) representing levels of detected visual differences in subtitle and background colors for portions of the subtitle text.

For the case in which subtitle enhancement program 200 determines the level of similarity to be "low" (step 245, "LOW" branch), indicating that the font attributes of the subtitle text segment for the selected background portion allow a viewing user to clearly distinguish the subtitle text from the background, subtitle enhancement program 200 takes no action to change the font attributes of the subtitle text segment, and the subtitle text segment remains the same (step 250). The subtitle text maintains an original color, and the background portion corresponding to the subtitle text is not modified.

Having determined the level of similarity to be "low", subtitle enhancement program 200 proceeds to store the enhanced subtitle portion (step 270). For the case in which a "low" level of similarity is determined, the background color of the selected portion and the subtitle text color are clearly distinguishable, and no action of enhancement is taken. The subtitle font within the selected portion of the video frame remains the same and is stored in enhanced subtitle file 160.

For the case in which subtitle enhancement program 200 determines the level of similarity to be "mid" (step 245 "MID" branch), subtitle enhancement program 200 makes tone variations to enhance the text of the subtitle portion (step 255). Subtitle enhancement program 200 determines that the level of similarity requires enhancement of the subtitle text tone such that the enhanced color of the subtitle text creates a greater distance from the color of the background portion corresponding to the subtitle text segment. Subtitle enhancement program 200 applies the tone variation to the subtitle text and in some embodiments, may apply the tone variation to the entire subtitle sentence. In some embodiments, subtitle enhancement program 200 may also take into consideration the display device color settings and the environmental lighting in determination of the tone variation to apply, if the information is available and received by subtitle enhancement program 200, as discussed in step 205 of FIG. 2.

For example, if the subtitle text includes an SBC of yellow and the display device settings of color tone are set to warm or environmental lighting conditions are high, the subtitle enhancement program 200 would apply a color change of the subtitle text determined to be a "mid" level of similarity to the background color towards a lighter tone of yellow. The subtitle text enhancement is saved with the corresponding video frame and, in some embodiments, processed forward to the rendering engine of the video display device. In other embodiments, the enhanced subtitle text and corresponding video frame are stored in a file, such as enhancement subtitle file 160 (FIG. 1). Subtitle enhancement program 200 proceeds to determine whether there are more subtitle sentences associated with the video frame.

Having applied the enhancement to the subtitle text of the portion, subtitle enhancement program 200 proceeds to store the enhanced subtitle portion (step 270). Subtitle enhancement program 200 stores the enhanced subtitle portion in a file corresponding to the plurality of video frames to which the subtitle text is applied, such as enhanced subtitle file 160 (FIG. 1).

For the case in which subtitle enhancement program 200 determines the level of similarity to be "high" (step 245 "HIGH" branch), subtitle enhancement program 200 applies contrasting font rendering variations to enhance the subtitle text portion (step 260). Subtitle enhancement program 200 determines a high level of similarity between the subtitle text color and the color of the background portion, and applies a font variation, such as an outline font stroke in a contrasting color (step 260), to outline the subtitle text and distinguish the text from the similar background color. In some embodiments of the present invention, the subtitle text is outlined with a dark color for a light color background, or a lighter color for a dark background color. In some embodiments, the subtitle text characters of the background portion with a high level of similarity are enhanced, whereas in other embodiments, all characters of the subtitle text are enhanced with the outlining font stroke.

For example, a sentence segment of subtitle text of a video frame includes the words "How do you know that it's true?" with the words "How do you" presented in a white color and positioned on the video frame over a white background portion, resulting in the subtitle text words being hidden in the background. Subtitle enhancement program 200 determines the level of similarity to be "high" (having a short distance between colors) and applies an outlining font stroke variation to the subtitle words "How do you". The outline stroke is done in a black or dark color and clearly outlines the text previously hidden by the background color. Subtitle enhancement program 200 proceeds to store the enhanced subtitle portion (step 270). Subtitle enhancement program 200 stores the enhanced subtitle portion in a file corresponding to the plurality of video frames to which the subtitle text is applied, such as enhanced subtitle file 160.

For the case in which subtitle enhancement program 200 determines the level of similarity to be "very high" (step 245 "VERY HIGH" branch), subtitle enhancement program 200 applies reverse image mode to enhance the subtitle text portion (step 265). Subtitle enhancement program 200 determines a very short distance between the subtitle text sentence color and the color of the background portion, indicating that the background color may be filled with the color of the subtitle text. Subtitle enhancement program 200 determines the level of similarity to be "very high" and applies a reverse mode enhancement to the background portion surrounding the subtitle text changing the background color immediately surrounding the subtitle text to create a contrast that enables clear visibility of the subtitle text.

For example, the subtitle text of a video frame includes the sentence "How do you know it's true?" in a dark grey color and is positioned over a background portion that is dark grey to black in color. The entire sentence is hidden in the background color. Subtitle enhancement program 200 determines the level of similarity to be "very high" and includes the entire sentence. Subtitle enhancement program 200 applies a reverse mode to a set of pixels surrounding the subtitle text, enhancing the subtitle text by changing the color of the background forming a shape surrounding the subtitle text to a color in contrast to the subtitle text. Subtitle enhancement program 200 forms a light-grey or white rectangle around the dark grey text, which and clearly depicts the subtitle text. Subtitle enhancement program 200 proceeds to store the enhanced subtitle portion (step 270). Subtitle enhancement program 200 stores the enhanced subtitle portion in a file corresponding to the plurality of video frames to which the subtitle text is applied, such as enhanced subtitle file 160.

Having stored the enhanced subtitle portion, subtitle enhancement program 200 determines whether the previously selected subtitle sentence includes more portions (decision step 275). In response to determining that the previously selected subtitle sentence includes more portions for selection (step 275, "YES" branch), subtitle enhancement program 200 proceeds to "C", returning to step 235 (FIG. 2) and selects a next portion of subtitle text and corresponding background, and continues as described above. For the case in which subtitle enhancement program 200 determines that the previously selected subtitle sentence does not include additional portions within the selected subtitle sentence (decision step 275, "NO" branch), subtitle enhancement program 200 determines whether the video frame includes more subtitle sentences for selection.

Having determined the level of similarity between the color of the subtitle text and the color of the background portion, applying the appropriate enhancement to the subtitle text, and determining there are no additional portions to consider for similarity level, subtitle enhancement program 200 determines whether the current video frame is associated with more subtitle sentences (decision step 280). For the case in which subtitle enhancement program 200 determines that the current video frame is associated with more subtitle sentences (step 280, "YES" branch), subtitle enhancement program 200 follows point "B" and returns to step 210 (FIG. 2) to select the next subtitle text sentence and proceeds as described above.

For the case in which subtitle enhancement program 200 determines that the current video frame does not include additional sentences (step 280, "NO" branch), subtitle enhancement program 200 returns to step 205, receives the next frame and proceeds as described above. When all frames of the video have been processed subtitle enhancement program 200 ends.

Embodiments of the present invention are not limited to the levels of similarity described herein as low, mid, high, and very high. The embodiments including levels of similarity of low, mid, high, and very high are but one set of a plurality of possible levels of similarity that may be applied. The embodiments present the aspects of determining portions of the background corresponding to the occupied area of the subtitle text and determining the distance between colors of the subtitle text, and the color of the corresponding background portion. Based on the distance calculated, an appropriate action is taken to enhance the subtitle text making the text more clearly visible, without detracting from the user experience of viewing the subject video.

Figure 4A:
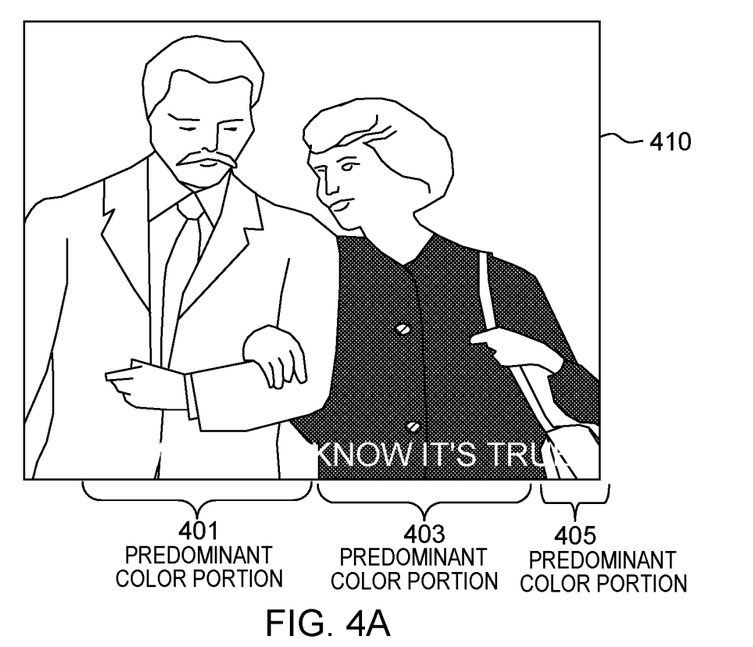
FIG. 4A depicts an example video frame with subtitle text displayed across multiple background portions having similar color, in accordance with an embodiment of the present invention.

FIG. 4A depicts an example video frame with subtitle text displayed across multiple background portions having similar color, in accordance with an embodiment of the present invention. Video frame 410 includes subtitle text positioned towards the bottom of video frame 410. The background area corresponding to the subtitle text is shown as segmented into three portions, based on predominant color of the respective background portions, predominant color portion 401, predominant color portion 403, and predominant color portion 405. The subtitle text color has varying degrees of contrast across the background portions resulting in difficulty for users reading the subtitle text. In some embodiments of the present invention, predominant color portion 401 and predominant color portion 405 have similarity levels of "high", and enhancement of the subtitle text in which the contrast between background and subtitle text colors is increased, will render the subtitle text more visible.

Figure 4B:
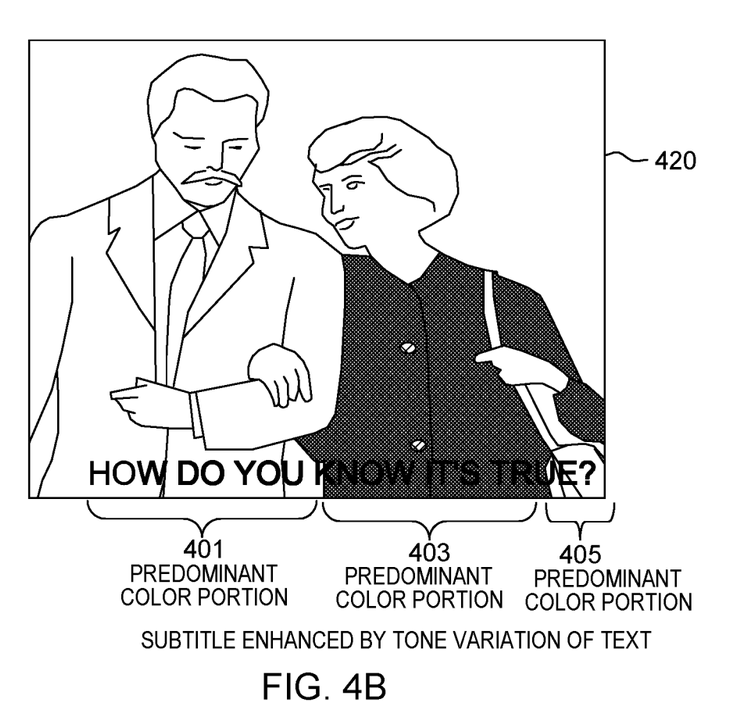
FIG. 4B depicts an example video frame with subtitle text enhanced with a font tone variation, in accordance with an embodiment of the present invention.

FIG. 4B depicts an example video frame with subtitle text enhanced with a font tone variation, in accordance with an embodiment of the present invention. Video frame 420 includes the subtitle text enhanced with a change to the font color tone, lightening the font color with respect to predominant color portion 401 and predominant color portion 405. The enhancement to the subtitle text results in more visible text and does not distract from the user experience.

Figure 5A:
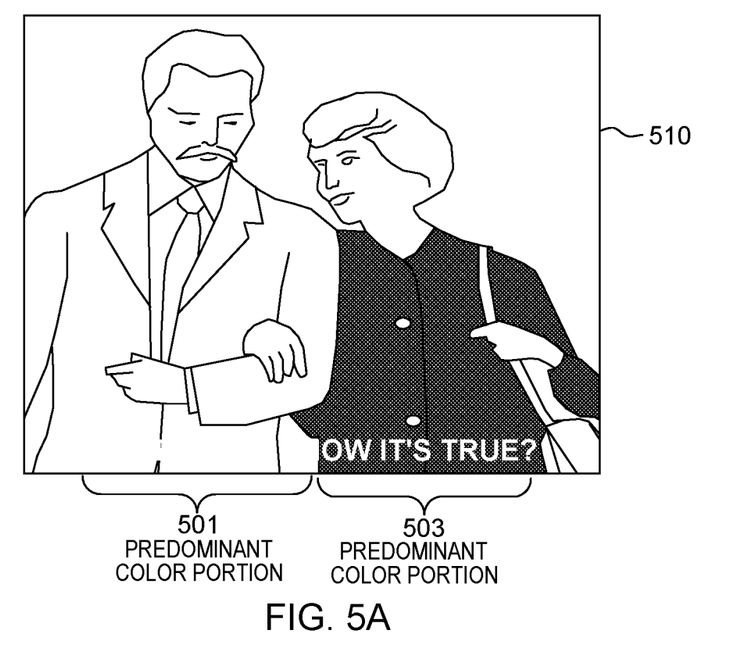
FIG. 5A depicts an example video frame with a portion of subtitle text displayed across a background portion having very high similarity of color, in accordance with an embodiment of the present invention.

FIG. 5A depicts an example video frame with a portion of subtitle text displayed across a background portion having very high similarity of color, in accordance with an embodiment of the present invention. Video frame 510 includes subtitle text positioned towards the bottom of video frame 510. The background area corresponding to the subtitle text is shown as segmented into two portions, based on predominant color of the respective background portions, predominant color portion 501, and predominant color portion 503. The subtitle text color is very similar to the background color of predominant color portion 501, resulting in difficulty for users reading the subtitle text and enhancement of the subtitle text increasing the contrast between predominant color portion 501 of the background and the portion of the subtitle text overlaying predominant color portion 501 will render the subtitle text more visible.

Figure 5B:
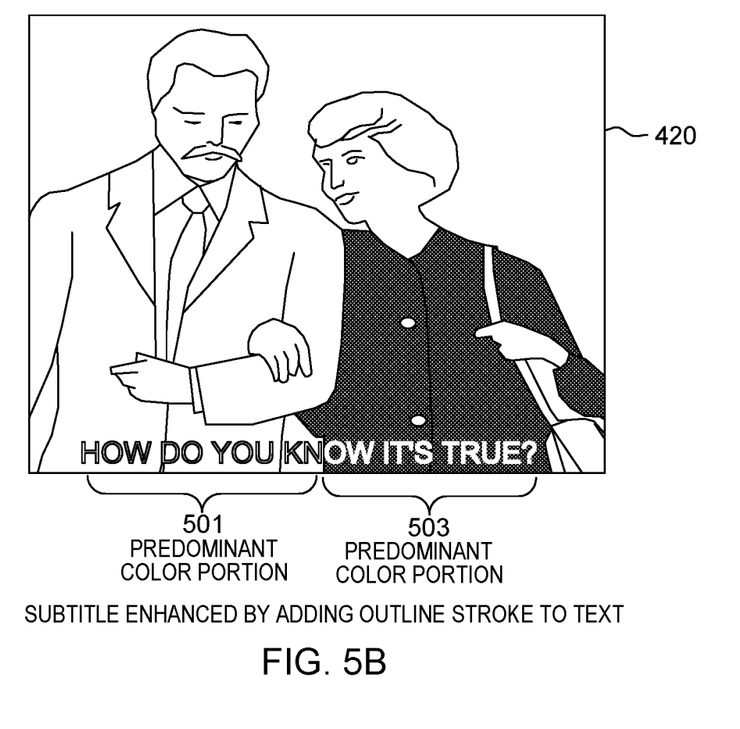
FIG. 5B depicts an example video frame with a portion of subtitle text enhanced with a font stroke outline of contrasting color, in accordance with an embodiment of the present invention.

FIG. 5B depicts an example video frame with a portion of subtitle text enhanced with a font stroke outline of contrasting color, in accordance with an embodiment of the present invention. Video frame 520 includes the subtitle text enhanced with a contrasting font stroke outlining the subtitle text within predominant color portion 501. The enhancement to the subtitle text results in more visible text without distraction from the user experience. The portion of subtitle text overlaying predominant color portion 503 is determined to have distance between the color of the subtitle text and the color of the background portion such that no enhancement is required.

Figure 6:
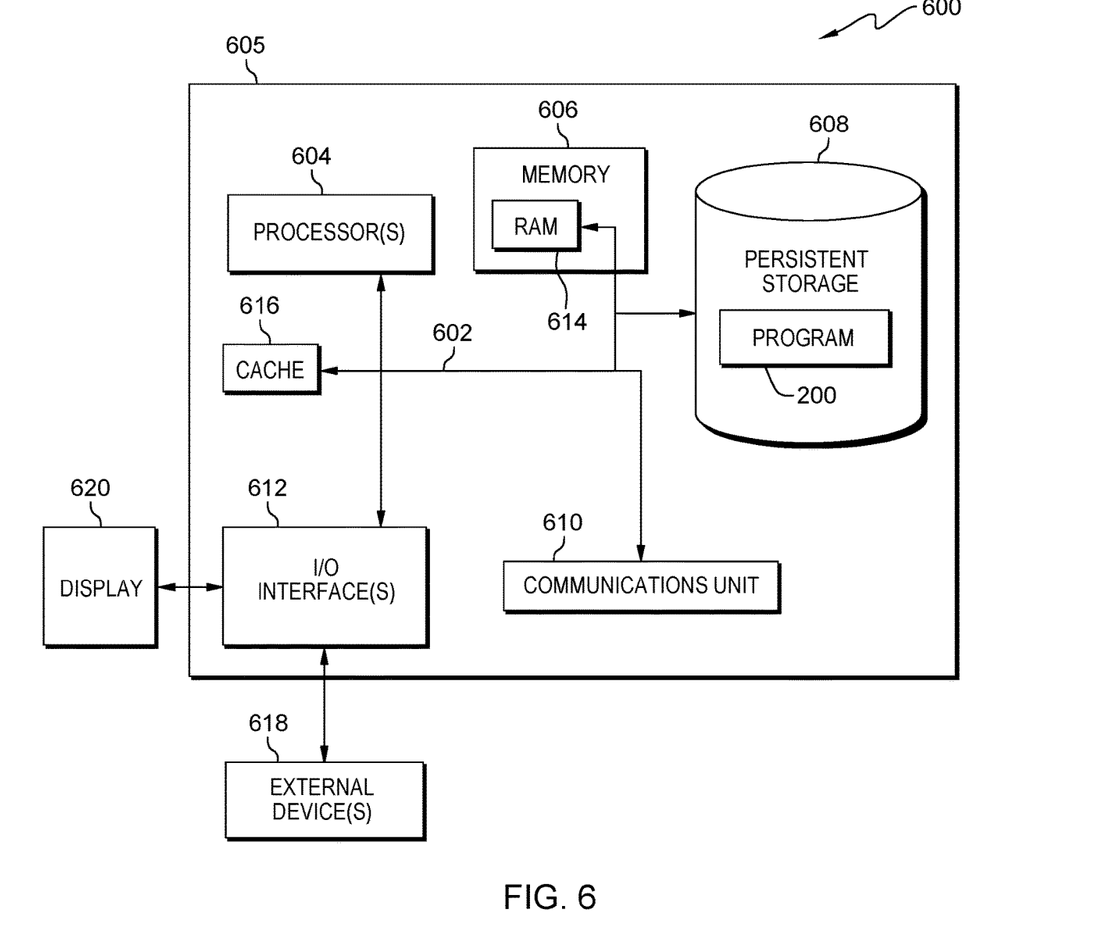
FIG. 6 depicts a block diagram of components of a computing system, including a computing device capable of operationally performing the subtitle enhancement program of FIGS. 2 and 3, in accordance with an embodiment of the present invention.

FIG. 6 depicts a block diagram of components of computing system 600, including computing device 605, configured to include or operationally connect to components depicted in FIG. 1, and capable of performing operational steps of subtitle enhancement program 200 of FIGS. 2 and 3, in accordance with an embodiment of the present invention, in accordance with an embodiment of the present invention.

Computing device 605 includes components and functional capability similar to components of video rendering device 110 (FIG. 1), in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 605 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606, cache memory 616, and persistent storage 608 are computer readable storage media. In this embodiment, memory 606 includes random access memory (RAM) 614. In general, memory 606 can include any suitable volatile or non-volatile computer readable storage media.

In one embodiment, subtitle enhancement program 200 is stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of distributed data processing environment 100. In these examples, communications unit 610 includes one or more network interface cards. Communications unit 610 may provide communications through the use of either or both physical and wireless communications links. Subtitle enhancement program 200 may be downloaded to persistent storage 608 through communications unit 610.

I/O interface(s) 612 allows for input and output of data with other devices that may be connected to computing system 600. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., subtitle enhancement program 200 can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for modifying a subtitle of a video frame, the method comprising:
    one or more processors receiving subtitle text representing audio content of a video frame and font attributes associated with the subtitle text;
    the one or more processors identifying a color associated with the subtitle text, based on the font attributes associated with the subtitle text;
    the one or more processors calculating within the video frame an occupancy area of the subtitle text;
    the one or more processors determining portions of the subtitle text, wherein a portion of the subtitle text includes a character of the subtitle text;
    the one or more processors determining a predominant color of a background within a portion of the occupancy area of the subtitle text, wherein the portion of the occupancy area includes a predominant color of the background bordering the character of the portion of the subtitle text;
    the one or more processors determining a level of similarity between the color associated with the character of the portion of the subtitle text and the predominant color of the background bordering the character within the portion of the occupancy area; and
    the one or more processors performing a modification to the character of the subtitle text corresponding to the portion of the occupancy area, based on the level of similarity determined between the predominant color of the portion of the occupancy area bordering the character and the color of the character of the portion of the subtitle text.

2. The method of claim 1, further comprising:
    the one or more processors rendering the modification of the portion of the subtitle text within the video frame, wherein the modification changes the set of characters of the subtitle text to a color in contrast to the background color bordering the portion subtitle text; and
    the one or more processors transmitting the video frame rendered with the modified subtitle text to a video display device.

3. The method of claim 1, further comprising:
    the one or more processors rendering the modification of the subtitle text with the video frame, wherein the modification reduces the level of similarity during display of the video frame, and
    the one or more processors transmitting the enhanced subtitle text to storage separate from the video frame.

4. The method of claim 1, wherein the determination of the portion within the occupancy area is based on determining the level of similarity at a subtitle text granularity of a sentence, one or more words, and one or more characters.

5. The method of claim 1, further comprising:
    the one or more processors calculating modification information of the subtitle text, based on font attributes of the subtitle text within the occupancy area of the video frame, and the color associated with respective portions of a background area bordering the portion within the occupancy area.

6. The method of claim 1, wherein the subtitle text is processed in subsets of characters tokenized from an entire set of characters of the subtitle text of the video frame.

7. The method of claim 1, further comprising:
    the one or more processors calculating a predominant color of a background area corresponding to a sentence of the subtitle text, as a sentence portion of the background;
    the one or more processors calculating a predominant color of a background area corresponding to individual words of the subtitle text as word portions of the background;
    the one or more processors calculating a predominant color of a background area corresponding to characters of the subtitle text as character portions of the background; and
    the one or more processors determining the level of similarity based on a predominant color of the sentence, the individual words, and the characters of the subtitle text.

8. The method of claim 1, wherein performing the modification of the subtitle text includes selecting a modification strategy based on the level of similarity.

9. The method of claim 8, wherein performing the modification of the subtitle text includes selecting the modification strategy from a group consisting of: leaving an original color of the subtitle text unchanged, modifying a tone of the original color of the subtitle text, modifying the subtitle text with a contrasting outline font stroke, and modifying the subtitle text by changing a color of the occupancy area within the video frame forming a shape surrounding the subtitle text to a new color in contrast to the original color of the subtitle text.

10. The method of claim 1, wherein determining the level of similarity includes calculating a distance in a color space between the color of the subtitle text and the color of the background bordering the set of characters within the portion of the occupancy area of the subtitle text.

11. The method of claim 1, wherein determining the level of similarity includes information associated with a display device settings and lighting conditions of an environment of the display device.

12. A computer program product for modifying a subtitle of a video frame, the computer program product comprising:
one or more computer readable storage media and program instructions stored on the one or more computer readable storage media, the program instructions comprising:
program instructions to receive subtitle text representing audio content of a video frame and font attributes associated with the subtitle text;
program instructions to identify a color associated with the subtitle text, based on the font attributes associated with the subtitle text;
program instructions to calculate within the video frame an occupancy area of the subtitle text;
program instructions to determine portions of the subtitle text, wherein a portion of the subtitle text includes a character of the subtitle text;
program instructions to determine a predominant color of a background within a portion of the occupancy area of the subtitle text, wherein the portion of the occupancy area includes a predominant color of the background bordering the character of the portion of the subtitle text;
program instructions to determine a level of similarity between the color associated with the character of the portion of the subtitle text and the predominant color of the background bordering the character within the portion of the occupancy area; and
program instructions to perform a modification to the character of the subtitle text corresponding to the portion of the occupancy area, based on the level of similarity determined between the predominant color of the portion of the occupancy area bordering the character and the color of the character of the portion of the subtitle text.

13. The computer program product of claim 12, further comprising:
program instructions to render the modification of the portion of the subtitle text within the video frame, wherein the modification changes the set of characters of the subtitle text to a color in contrast to the background color bordering the portion subtitle text; and
program instructions to transmit the video frame rendered with the modification of the subtitle text to a video display device.

14. The computer program product of claim 12, wherein the determination of the portion within the occupancy area is based on determining the level of similarity at a subtitle text granularity of a sentence, one or more words, and one or more characters.

15. The computer program product of claim 12, further comprising:
program instructions to calculate modification information of the subtitle text, based on font attributes of the subtitle text within the occupancy area of the video frame, and the color associated with respective portions of a background area within the occupancy area; and
program instructions to process the subtitle text in subsets of characters tokenized from an entire set of characters comprising the subtitle text of the video frame.

16. The computer program product of claim 12, further comprising:
program instructions to calculate a predominant color of a background area corresponding to a sentence of the subtitle text, as a sentence portion of the background;
program instructions to calculate a predominant color of a background area corresponding to individual words of the subtitle text as word portions of the background;
program instructions to calculate a predominant color of a background area corresponding to characters of the subtitle text as character portions of the background; and
program instructions to determine the level of similarity based on a predominant color of the sentence, the individual words, and the characters of the subtitle text.

17. A computer system for modifying a subtitle of a video frame, the computer system comprising:
one or more computer processors;
one or more computer readable storage media; and
program instructions stored on the one or more computer readable storage media, the program instructions comprising:
program instructions to receive subtitle text representing audio content of a video frame and font attributes associated with the subtitle text;
program instructions to identify a color associated with the subtitle text, based on the font attributes associated with the subtitle text;
program instructions to calculate within the video frame an occupancy area of the subtitle text;
program instructions to determine portions of the subtitle text, wherein a portion of the subtitle text includes a character of the subtitle text;
program instructions to determine a predominant color of a background within a portion of the occupancy area of the subtitle text, wherein the portion of the occupancy area includes a predominant color of the background bordering the character of the portion of the subtitle text;
program instructions to determine a level of similarity between the color associated with the character of the portion of the subtitle text and the predominant color of the background bordering the character within the portion of the occupancy area; and
program instructions to perform a modification to the character of the subtitle text corresponding to the portion of the occupancy area, based on the level of similarity determined between the predominant color of the portion of the occupancy area bordering the character and the color of the character of the portion of the subtitle text.

18. The computer system of claim 17, wherein performing the modification of the subtitle text includes selecting a modification strategy based on the level of similarity.

19. The system of claim 18, wherein the program instructions to perform the modification of the subtitle text includes program instructions to select the modification strategy from a group consisting of: leaving the subtitle text with an original color, modifying a tone of an original color of the subtitle text, modifying the subtitle text with a contrasting outline font stroke, and modifying the subtitle text by changing a color of the occupancy area within the video frame forming a shape surrounding the subtitle text to a new color in contrast to the original color of the subtitle text.

20. The system of claim 17, wherein determining the level of similarity includes the program instructions to calculate a distance in a color space between the color of the subtitle text and the color of the background bordering the set of characters within the portion of the occupancy area of the subtitle text.

\* \* \* \* \*